us007454077B1

United States Patent
MacKenzie et al.

(10) Patent No.: US 7,454,077 B1
(45) Date of Patent: Nov. 18, 2008

(54) SLIDESHOW ANIMATION ALGORITHMS

(75) Inventors: Mark D. MacKenzie, Seattle, WA (US);
Louis Amadio, Sammamish, WA (US);
Mark S. Newell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 10/878,749

(22) Filed: Jun. 28, 2004

(51) Int. Cl.
*G06K 9/36* (2006.01)
(52) U.S. Cl. ...................................... 382/250
(58) Field of Classification Search ................ 382/224, 382/250, 128, 305; 345/473; 707/500
See application file for complete search history.

(56) References Cited

U.S. PATENT DOCUMENTS 6,396,500 B1 * 5/2002 Qureshi et al. .............. 345/473

2002/0067857 A1 * 6/2002 Hartmann et al. ........... 382/224
2002/0087592 A1 * 7/2002 Ghani ......................... 707/500
2003/0048289 A1   3/2003 Vronay

OTHER PUBLICATIONS

Mastering Microsoft Office 2000 Professional Edition, Gini Couter and Annette Marquis, Copyright 1999 SYBEX Inc.

* cited by examiner

*Primary Examiner*—Duy M Dang
(74) *Attorney, Agent, or Firm*—Shook, Hardy & Bacon L.L.P.

(57) ABSTRACT

A system and method for presenting images to a user. A set of available animations to be performed when presenting digital images to a user is defined. A digital image and an available animation are selected. The selection of the available animation may include consideration of a previously performed animation and/or consideration of attributes of the selected digital image. The selected digital image is then presented to the user, and the selected animation is performed with respect to the image. The invention further includes methods for providing a slide show of digital images to a user.

36 Claims, 8 Drawing Sheets

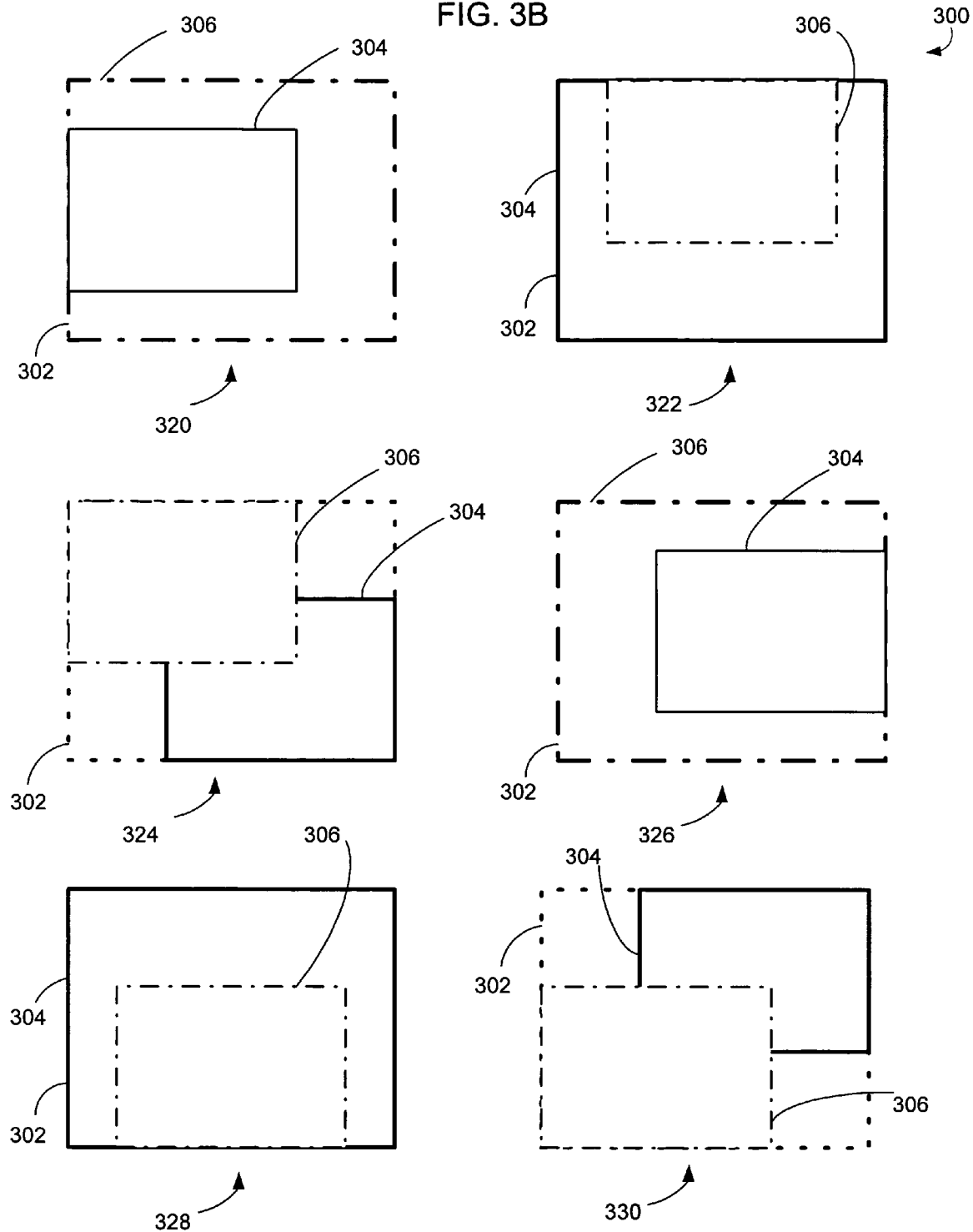

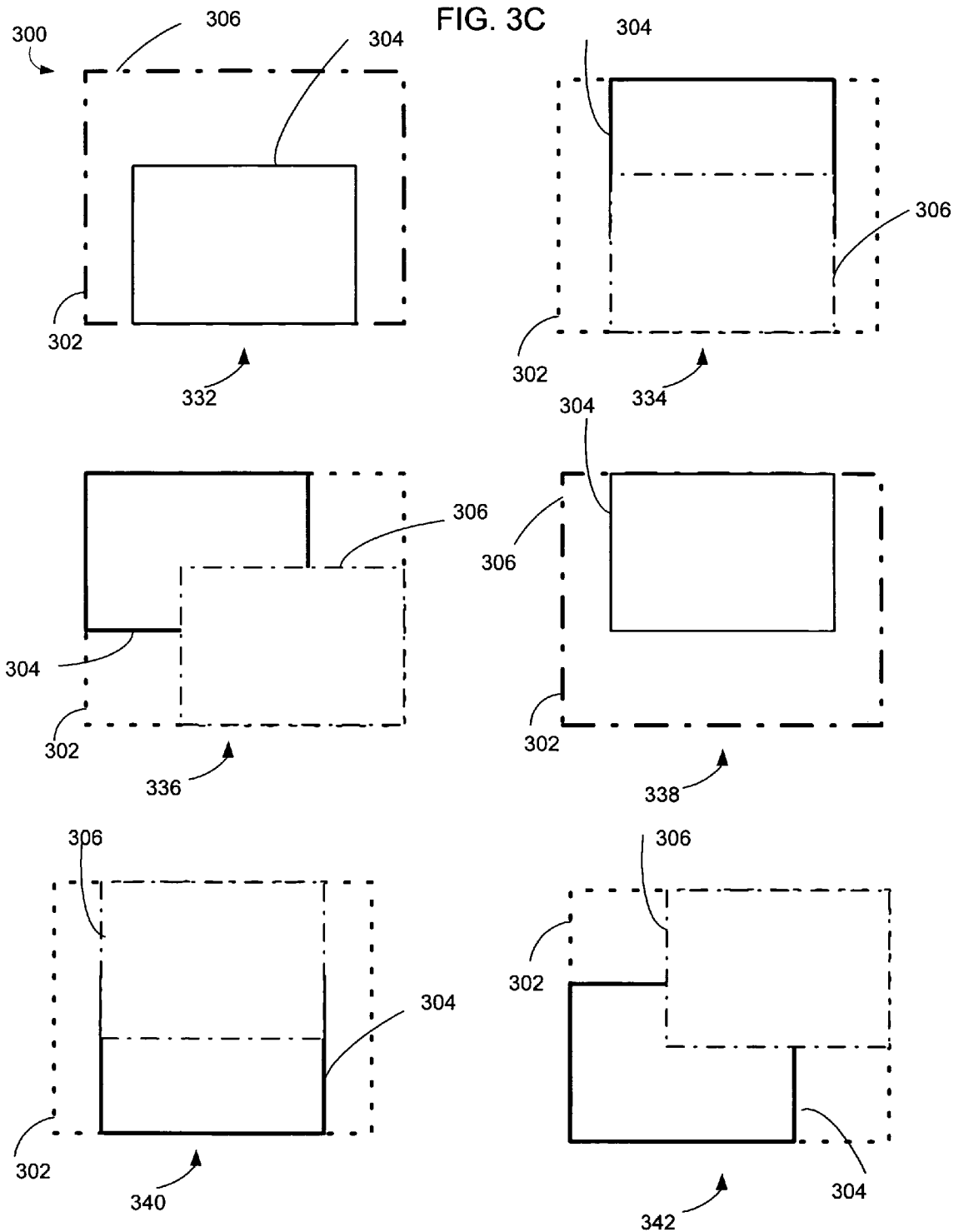

SLIDESHOW ANIMATION ALGORITHMS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates generally to the field of computer software. More particularly, the present invention relates to improved techniques for the presentation of digital images.

BACKGROUND OF THE INVENTION

Providing users of computers with interesting and engaging tools for presenting content stored upon a computer has become increasingly important as the information stored in computing environments has grown and diversified. For example, millions of families now use digital cameras to snap hundreds of images each year. These images are often stored on a computer, and users rely on various computerized utilities to display and interact with their photos.

In order to present these photos and other digital images, a variety of user interfaces and presentation techniques are currently commercially available. For example, Microsoft Corporation's 2002 release of Windows® XP Media Center Edition includes a feature that presents images in a slideshow. To transition between digital images, this version of Windows® XP provides two options. The first is a transition without any effects. This presentation is very similar to a traditional, non-computerized slide projector; the images are simply presented one after another. The second option provides for a softer transition between the images. The first image slowly disappears as a second image is blended into view. Another commercially available slideshow is provided by Apple Corporation's iPhoto. iPhoto offers a set of predetermined transition animations from which a user can choose the direction of movement and the speed of the transition from one image to another. After a user has dictated which effects are desired, the application presents a slide show in accordance with the user's directions.

While these slideshows provide functional presentations of digital images, they include only predictable and preset presentations of the images. They do not create a show with effects and animations selected to provide an engaging user experience. Accordingly there is a need for improved techniques for the presentation of digital images.

SUMMARY OF THE INVENTION

The present invention meets the above needs and overcomes one or more deficiencies in the prior art by providing a system and method for the presentation of digital images. In one aspect of the present invention, a computer-implemented method for presenting digital images to a user is provided. A set of available animations to be performed when presenting the images to a user are defined. A digital image and an available animation is selected. The selection of the available animation includes consideration of a previously performed animation. The selected digital image is then presented to the user, and the selected animation is performed with respect to the image.

A further aspect of the present invention includes a computerized method for presenting digital images to a user. A set of available animations to be performed with respect to the presentation of the images is defined. One of the images is selected for presentation to the user. One or more of the animations are removed from the set of available animations. At least one removal includes consideration of a previously performed animation. The selected digital image is then presented to the user, and one of the available animations is performed with respect to the presentation of the image.

Another aspect of the present invention includes a computer-readable media having computer-useable instructions for performing a method of presenting digital images to a user. A set of digital images and a set of available animations are provided. One of the images is selected for presentation to the user, and one or more of the animations are removed from the set of available animations. At least one removal includes consideration of an attribute of the selected digital image. One of the remaining animations is selected from the set of available animations. The selected digital image is then presented to the user, and the selected animation is performed with respect to the presentation of the image.

In yet another aspect of the present invention, a computerized method for providing a slide show of digital images to a user is included. A set of digital images to be presented in a slide show and a set of available animations are provided. A set of animation rules is defined. The animation rules may relate to an order in which the animations are to be performed. The digital images are presented to the user. Such presentation includes performance of available animations selected in accordance with the set of animation rules.

BRIEF DESCRIPTION OF THE SEVERAL VIEWS OF THE DRAWINGS

The present invention is described in detail below with reference to the attached drawing figures, wherein:

FIGS. 3A-3C are block diagrams of exemplary animations which may be utilized with the present invention;

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein and wherein.

The present invention provides an improved system and method for the presenting digital images to a user. An exemplary operating environment for the present invention is described below.

Figure 1:
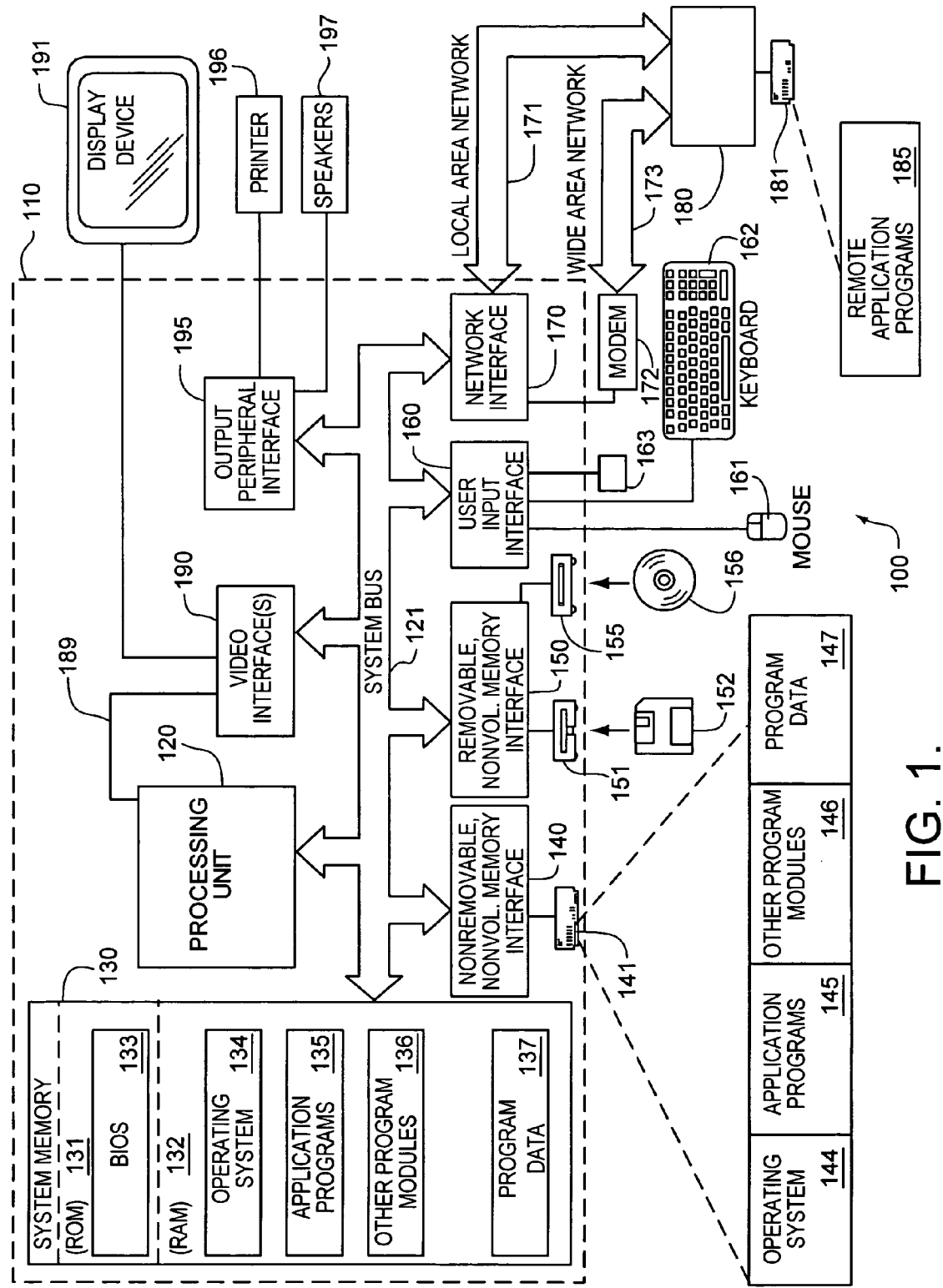
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

The present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

As previously mentioned, the current invention relates an improved system and method for presenting digital images to a user. A digital image may be any piece of content displayable to a user or any piece of content having a graphical representation. For example, a digital image may be a digital photograph or may be a file such as a bitmap or a JPEG.

Figure 2:
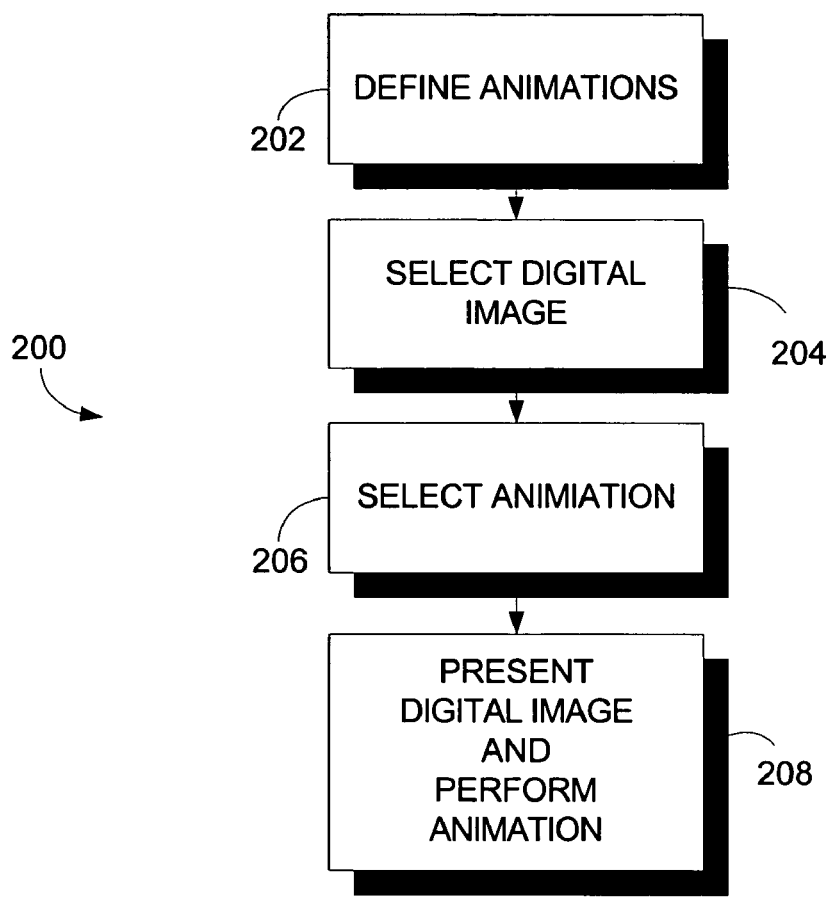
FIG. 2 is a flow diagram showing a method for presenting digital images to a user in accordance with the present invention.

FIG. 2 displays a flow diagram showing a method 200 for presenting digital images to a user in accordance with the present invention. At 202, the method 200 defines a set of available animations. These animations may be any visual effect performed when presenting a digital image. The animations may relate to the manner in which the images are placed or removed from the screen, or the animations may relate to the presentation of the images. For example, an animation may add movement to the presentation of a digital image.

Figure 3A:
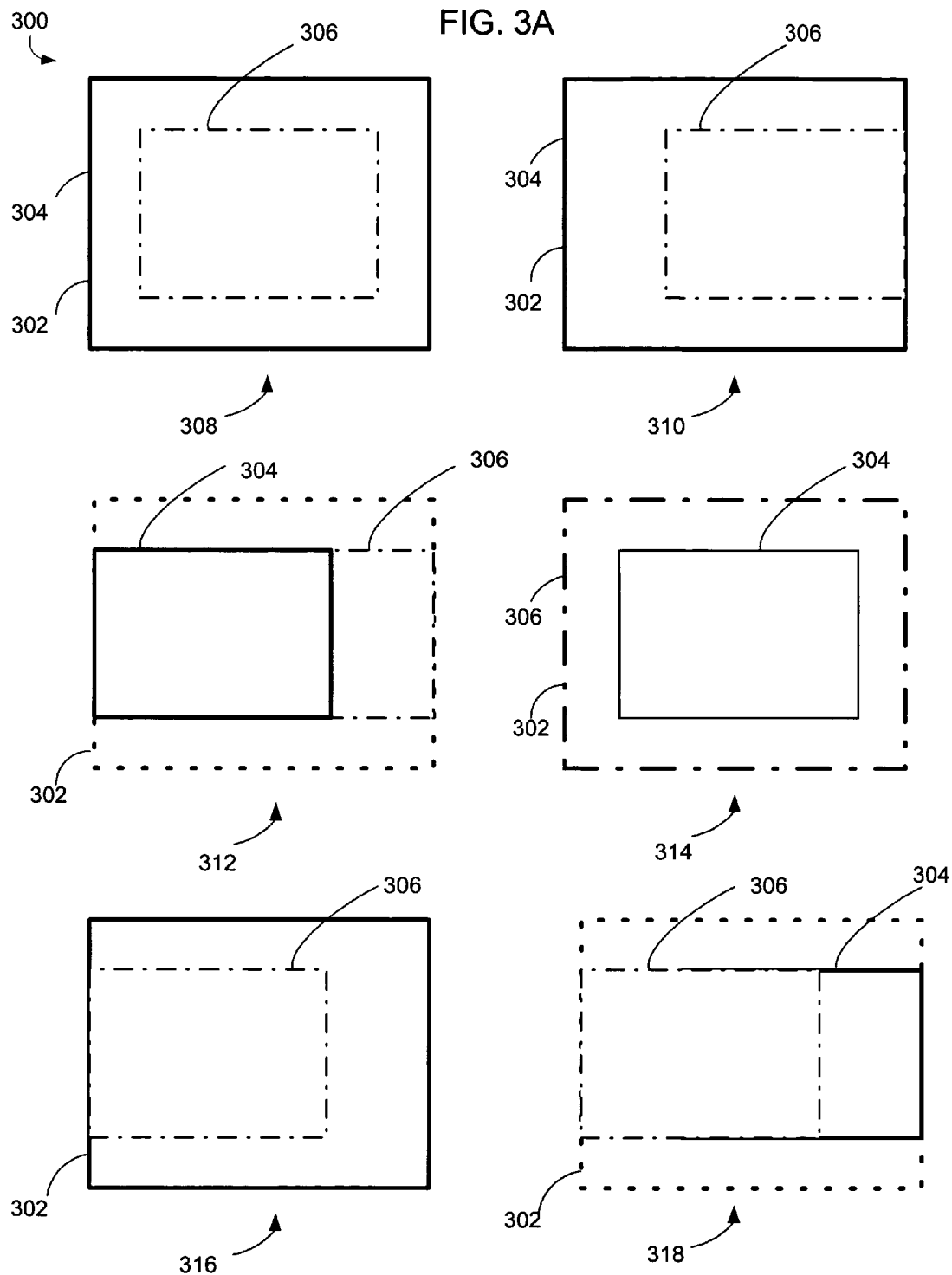

FIGS. 3A-3C show an exemplary set of animations 300 which may be utilized with the present invention. It should be noted that set 300 is provided only as an example and any number of animation sets are acceptable for the present invention. The animations within set 300 add movement to the presentation of a digital image. These effects may be analogous to a camera panning within the picture. Each animation within set 300 is represented by a block diagram having a frame 302, a starting view 304, and a finishing view 306. The frame 302 defines the edges of the entire digital image. As will be explained, the various animations within set 300 may or may not present the entire image. The starting view 304 shows the perspective of the digital image that is initially shown to the user, while the finishing view 306 shows the perspective shown at the conclusion of the animation; the animations within set 300 first present the starting view 304 and then pans or zooms to the finishing view 306. Depending on which animation is selected, the effect zooms in or out, moves left or right, and/or moves up or down. According to one embodiment of the present invention, at least 80 percent of the image is viewable at all time. This minimizes the risk that important attributes of the image will not be shown. However the invention may utilize animations that present smaller fractions of an image.

The eighteen animations, animations 308-342, which make up set 300 are shown on FIGS. 3A-3C. For example, animation 308 is a zoom-in animation with no horizontal or vertical movement. Hence, when an image is presented with animation 308, first the entire image is shown and then the animation zooms in on the center of the picture as shown by the finishing view 306. Animation 310 is a zoom-in and a pan to the right animation. As will be understood by those skilled in the art, this animation appears as if a camera is zooming in on the finishing view 306, which is in a position offset to the right. Table 1 summarizes the movement effects associated with each animation shown in FIGS. 3A-3C.

TABLE 1

| Animation | Movement effect |
| --- | --- |
| Animation 308 | Zoom-in |
| Animation 310 | Zoom-in and to the right |
| Animation 312 | Pan right |
| Animation 314 | Zoom-out |
| Animation 316 | Zoom-in and to the left |
| Animation 318 | Pan left |
| Animation 320 | Zoom-out and to the right |
| Animation 322 | Zoom-in and up |
| Animation 324 | Pan up and to the left |
| Animation 326 | Zoom-out and to the left |
| Animation 328 | Zoom-in and down |
| Animation 330 | Pan down and left |
| Animation 332 | Zoom-out and up |
| Animation 336 | Pan down and right |
| Animation 338 | Zoom-out and down |
| Animation 340 | Pan up |
| Animation 342 | Pan up and to the right |

As will be understood by those skilled in the art, any number of animation effects are acceptable for use with the present invention, and developers may choose which animation are most appropriate for a given presentation. For example, set 300 does not include animations that zoom, pan vertically, and pan horizontally at the same time. A developer may decide that such an effect is inappropriate for the presentation, and, thus, these animations are not included in set 300.

Returning to FIG. 2, once the set of animations is defined, at 204 a digital image is selected for presentation to the user. Any digital image may be appropriate for presentation according to the present invention, and the image may be selected from a variety of sources and a in accordance with a variety of criteria. For instance, a user may specify that images stored in a particular storage location/folder should be presented. As will be understood by those skilled in the art, any number of presentation platforms and techniques may be utilized with the present invention. For example, the image may be selected as part of a slideshow in which various images are shown to the user.

At 206, one of the available animations is selected. In order to ensure an enjoyable presentation of various digital images, developers may provide a variety of selection criteria. The goal of these selection rules may be to create an interesting and engaging presentation of various digital images.

According to one embodiment of the present invention, the selection of available animations includes consideration of previously performed animations. Those skilled in the art will recognize that such consideration may be designed to provide a presentation of the images and animations that flow from image to image. For example, the selection criteria may specify that the most recently performed animation may not be selected. Thus, no animation may be performed twice in a row. Another exemplary rule may be to eliminate each animation that reverses the movement of a previous animation in a given direction. For example, if the previously performed animation were a simple zoom-in (as in animation 308 in FIG. 3A), then each animation with a zoom-out would be ruled out from selection. Similarly, if the previously performed animation was a zoom-out and pan left (as in animation 326 in FIG. 3B), then each animation with a zoom-in or a pan right would be not be selected. Those skilled in the art will recognize that the foregoing rules are presented as mere examples and that previously performed animations may be considered in any number of ways during the selection of an available animation.

At 208, the selected digital image is presented to the user along with the selected animation. Depending upon the animation effect, the selected animation may occur at any time during the presentation of the image and may be accompanied by other visual effects. Further, the presentation may be accomplished in a variety of different manners and upon a variety of different platforms. For example a series of digital images may be presented in a slideshow. The images may be shown on a computer monitor or projected onto a screen. Each image may be shown one after another with a selected animation.

Figure 4:
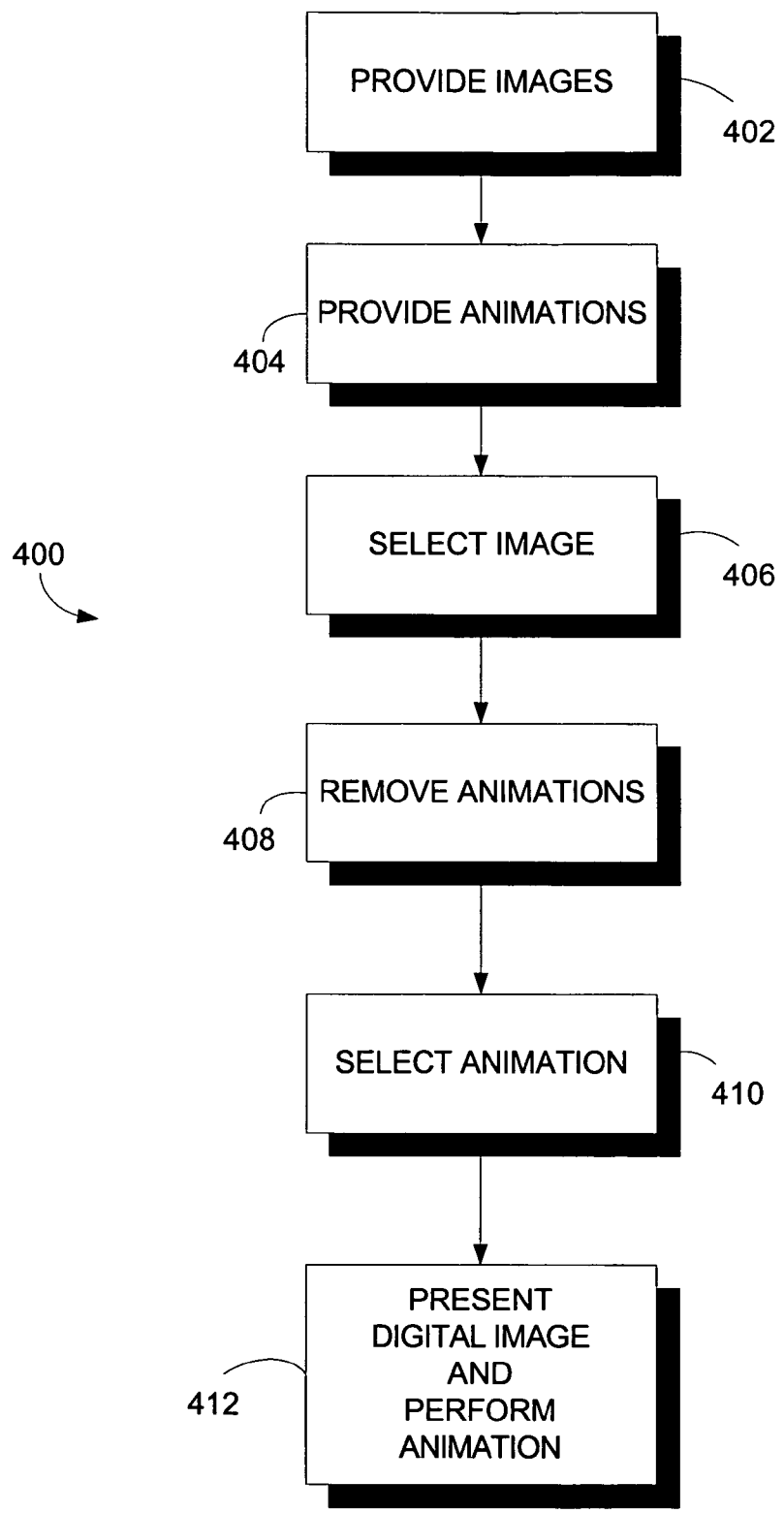
FIG. 4 is a flow diagram showing a method for presenting digital images to a user in accordance with the present invention.

FIG. 4 displays a flow diagram showing a method 400 for presenting digital images to a user in accordance with the present invention. At 402, a set of digital images is provided. As previously mentioned, a digital image may be any piece of content displayable to a user or any piece of content having a graphical representation.

At 404, the method 400 provides a set of available animations. These animations may be any visual effect performed along with the presentation a digital image. An exemplary set of animations is shown on FIGS. 3A-3C. The available animations may include any change in the presentation of a digital image as it is being displayed to the user. The animations may relate to the transition between images or may relate to movement upon a displayed image.

At 406, a digital image is selected for presentation to the user. Any digital image may be appropriate for presentation according to the present invention, and the image may be selected from a variety of sources and in accordance with a variety of criteria. For example, an image may be selected because the subject matter of the image relates to a theme for a slideshow.

Once an image is selected, at 408, one or more animations are removed from the set of available animations. Such removal may be based off consideration of an attribute of a digital image. For example, a set of animations may contain effects that zoom-in on a portion of a displayed digital image. By considering various attributes of the digital image, the method 400 may remove all animations that zoom-in on portions of the image that are least likely to contain interesting content.

Figure 5:
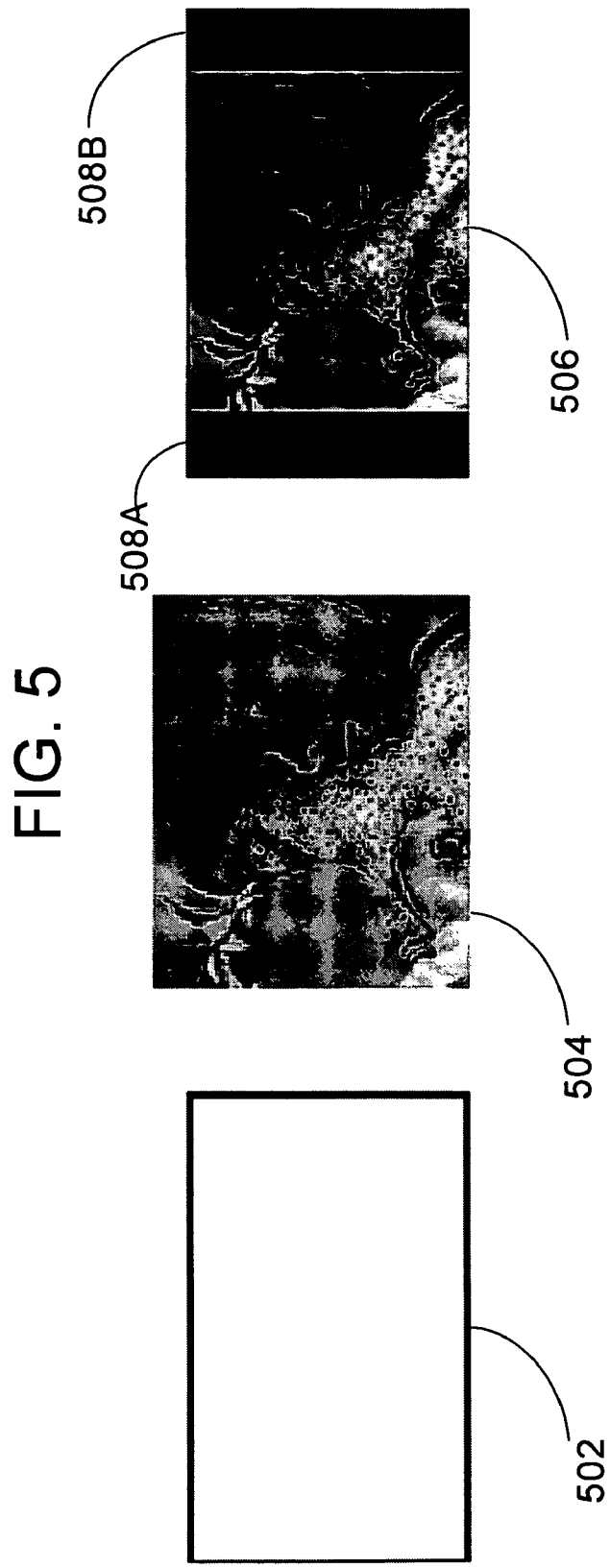
FIG. 5 is a block diagram showing a working image suitable for presentation in accordance with the present invention.

For instance, FIG. 5 shows a working image 506 for an exemplary image 504 in which the aspect ratio of the image 504 and a display monitor 502 do not match. As will be understood by those skilled in the art, the aspect ratio is the relationship between the width and height of an image or monitor. When the aspect ratio of an image and the monitor upon which it is displayed do not match, a working image must be created to bring the image's aspect ratio into accord with the monitor's ratio. For example, the monitor 502 has an aspect ratio of 16×9, while the image 504 has an aspect ratio of 4×3; the monitor 502 is more rectangular then the image 504. To compensate for this difference, the working image 506 must include vertical bars 508A and 508B. The bars 508A and 508B allow the image 504 to be presented upon the 16×9 monitor 502.

Because the working image 506 has no content on the vertical bars 508A and 508B (i.e. the extreme right and left regions), any animation that zooms in on the right or left region of an image may be removed from the set of available animations. Considering the set 300 of animations shown on FIGS. 3A-3C, each animation which includes a zoomed-in view of either the right or left portion of the images may be removed from the set of available animations. Stated more generally, all animations that include movement on an axis perpendicular to the bars (horizontally in this example) are excluded from the set of available animations. These animations with horizontal movement include animations 310, 312, 316, 318, 320, 324, 326, 330, 336, and 342. As seen in this example, the only remaining available animations have vertical movement and/or zoom in or out. As will be understood by those skilled in the art, any number of criteria that consider image attributes may be used with the present invention to remove animations that are inappropriate for a given image. According to one embodiment of the present invention, the bars are of equal width. Accordingly, even in a zoom animation, the bars remain the same size.

According to one embodiment of the present invention, the removal of available animations may include consideration of previously performed animations. For example, no animation may be performed twice in a row. Another exemplary rule may be to eliminate each animation that reverses the movement of a previous animation in a given direction. Those skilled in the art will recognize that the foregoing rules are presented as mere examples and that previously performed animations may be considered in any number of ways during the removal of available animations.

At 410, one of the remaining available animations is selected, and, at 412, the selected digital image is presented to the user while the selected animation is performed. The selected animation may occur at any time during the presentation of the image and may include any number of visual effects. Further, the presentation may be accomplished in a variety of different manners and upon a variety of different platforms. For example a series of digital images may be presented in a slideshow as the images are shown one after another with the selected animations.

Figure 6:
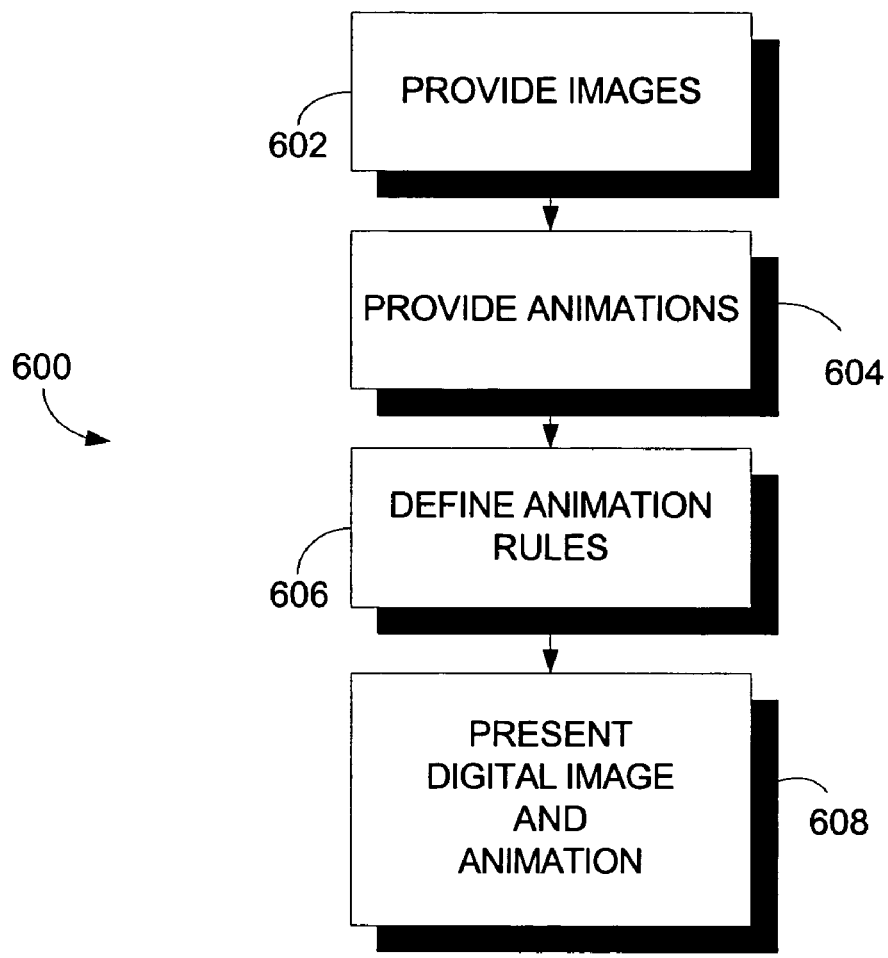
FIG. 6 is a flow diagram showing a method for presenting a slide show of digital images to a user in accordance with the present invention.

FIG. 6 displays a flow diagram showing a method 600 for presenting a slide show of digital images to a user in accordance with the present invention. At 602, a plurality of digital images are provided. As previously mentioned, a digital image may be any piece of content displayable to a user or any piece of content having a graphical representation. At 604, a set of available animation is provided. These animations may be performed when presenting a digital image and any number of animations are acceptable for use with the present invention. The animations may relate to image transitions or may relate to changes in the presentation of an image to a user.

At 606, the method 600 defines a set of animation rules. These rules may relate to the selection of an animation for presentation to the user. For example, the animation rules may dictate a certain order for the animations to be performed in a slideshow. According to one embodiment of the present invention, the animation rules remove animations from the set of available animations. In this embodiment, one of the remaining animations is then selected at random for presentation to the user. To remove the animations, the rules may consider image attributes and/or previously performed animations. As previously discussed, not all animations necessarily are appropriate for performance with each digital image. For example, if the right side of an image were known not to contain content of interest, it would be inappropriate to perform an animation that zooms in on the right side. Hence, by considering image attributes, inappropriate animations are not performed with respect to a digital image.

Similarly, the rules may consider previously performed animations so as to provide an engaging presentation of digital images that flows from one picture to another. For example, the rules may dictate that no animation may be performed twice in a row and that the selected animation is not simply the reverse of the previously selected animation. Those skilled in the art will recognize that the foregoing rules are presented as mere examples and that previously performed animations may be considered in any number of ways by the animation rules.

At 608, the digital images are presented to the user as a slideshow. This presentation includes the performance of available animations selected in accordance with the animation rules. As will be understood by those skilled in the art, the animations may occur at any time during the presentation of the images and may be accompanied by other visual effects. Furthermore, the slideshow may be presented in a variety of different manners and upon a variety of different platforms.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for presenting digital images to a user, the method comprising:
　defining a set of available animations to be performed when presenting one of the digital images;
　selecting one of the digital images to be presented to the user;
　removing one or more animations from said set of available animations by referencing a set of rules dictating that said one or more animations may not be performed subsequent to performance of one or more previously performed animations;
　in response to said removing, prohibiting a user from selecting the removed one or more animations for performance with respect to the selected digital image, wherein said prohibiting eliminates a user's option to select the removed one or more animations;
　selecting an available animation from the set of available animations; and
　presenting said selected digital image to the user and performing said selected animation with respect to the presentation of said selected digital image.

2. The computer-implemented method of claim 1 wherein at least a portion of the available animations within the set of available animations add movement to the presentation of a presented digital images.

3. The computer-implemented method of claim 2 wherein said movement alters the portion of said presented digital image viewable to the user.

4. The computer-implemented method of claim 2 wherein said movement includes zooming in or out upon said presented digital image.

5. The computer-implemented method of claim 2 wherein said movement includes panning horizontally and/or vertically upon said presented digital image.

6. The computer-implemented method of claim 1 wherein at least a portion of the available animations within the set of available animations provide effects related to a transition between presented images.

7. The computer-implemented method of claim 1 wherein said selected digital image is a digital photograph.

8. The computer-implemented method of claim 1 wherein said selected digital image is chosen for presentation in a slide show.

9. The computer-implemented method of claim 8 wherein said selected digital image includes content related to a theme for said slide show.

10. The computer-implemented method of claim 1 wherein said selection of an available animation includes removing one or more animations from the set of available animations based upon consideration of the most recently performed animation.

11. The computer-implemented method of claim 1 wherein said selection of an available animation includes consideration of one or more attributes of the selected digital image.

12. The computer-implemented method of claim 1 wherein said selection of an available animation includes consideration of one or more rules relating to an order for presenting said available animations.

13. The computer-implemented method of claim 1 wherein said selected digital image is presented in a slide show.

14. A computer-implemented method for presenting digital images to a user, the method comprising:
　defining a set of available animations to be performed with respect to the presentation of the digital images;
　selecting one of the digital images to be presented to the user;
　removing one or more of the animations from the set of available animations, wherein at least one of the removed animations is selected for removal with consideration of one or more previously performed animations, wherein said removing expressly prohibits the removed one more animations from being performed with respect to the selected digital image and eliminates a user's option to select the removed one or more animations; and presenting said selected digital image to the user and performing one of said available animations with respect to the presentation of the selected digital image.

15. The computer-implemented method of claim 14 wherein at least a portion of the available animations within the set of available animations add movement to the presentation of a presented digital images.

16. The computer-implemented method of claim 15 wherein said movement alters the portion of said presented digital image viewable to the user.

17. The computer-implemented method of claim 14 wherein at least a portion of the available animations within the set of available animations provide effects related to a transition between presented images.

18. The computer-implemented method of claim 14 wherein said selected digital image is a digital photograph.

19. The computer-implemented method of claim 14 wherein said selected digital image is presented in a slide show.

20. The computer-implemented method of claim 14 wherein removing one or more of the animations includes consideration of one or more attributes of the selected digital image.

21. The computer-implemented method of claim 14 wherein removing one or more of the animations includes consideration of one or more rules relating to an order for presenting said available animations.

22. One or more computer-readable media having computer-usable instructions embodied thereon for performing a method of presenting digital images to a user, the method comprising:
    providing a set of digital images to be presented to a user;
    providing a set of available animations to be performed along with the presentation of the digital images;
    selecting one of the digital images to be presented to the user;
    removing one or more of the animations from the set of available animations, wherein at least one of the removed animations is selected for removal with consideration of one or more attributes of said selected digital image;
    selecting one of the animations from the set of available animations; and
    presenting said selected digital image to the user and performing said selected animation with respect to the presentation of said selected digital image.

23. The computer-readable media of claim 22 wherein at least a portion of the available animations within the set of available animations add movement to the presentation of a presented digital images.

24. The computer-readable media of claim 23 wherein said movement includes zooming in or out upon said presented digital image.

25. The computer-readable media of claim 23 wherein said movement includes panning horizontally and/or verticality upon said presented digital image.

26. The computer-readable media of claim 22 wherein said selected digital image is a digital photograph.

27. The computer-readable media of claim 22 wherein said selected digital image is chosen for presentation in a slide show.

28. The computer-readable media of claim 22 wherein said one or more attributes of said selected digital image relate to one or more regions of the selected digital image not likely to contain content of interest to the user.

29. The computer-readable media of claim 28 wherein at least one of the removed animations includes movement directed at said one or more regions not likely to contain content of interest to the user.

30. The computer-readable media of claim 22 wherein removing one or more of the animations includes consideration of one or more previously performed animations.

31. The computer-readable media of claim 22 wherein removing one or more of the animations includes consideration of one or more rules relating to an order for presenting said available animations.

32. A computer-implemented method for providing a slide show of digital images to a user, the method comprising:
    providing a plurality of digital images to be presented in said slide show;
    providing a set of available animations to be performed when presenting the digital images;
    defining a set of animation rules, wherein at least one of the animation rules relates to an order in which said animations may be performed, wherein said set of animation rules dictates that one or more animations may not be performed subsequent to performance of one or more previously performed animations;
    removing at least one animation from said set of available animations by referencing said set of animation rules;
    utilizing a computer to randomly select one animation remaining in said set of available animations after said removing; and
    presenting said one or more of said digital image to the user, wherein said presentation includes performance of the selected animation in accordance with said set of animation rules.

33. The computer-implemented method of claim 32 wherein said presented digital images include content related to a theme for said slide show.

34. The computer-implemented method of claim 32 wherein at least a portion of the available animations within the set of available animations add movement to the presentation of a presented digital images.

35. The computer-implemented method of claim 32 wherein at least one of the animation rules includes consideration of one or more attributes of the presented digital images.

36. The computer-implemented method of claim 32 wherein at least one of the animation rules includes consideration of one or more previously performed animations.

* * * * *